United States Patent Office 3,383,420
Patented May 14, 1968

3,383,420
5-(γ-HYDROXYPROPYL)-5H-DIBENZO
[a,d]CYCLOHEPTENES
Norman L. Wendler, Summit, N.J., assignor to Merck & Co., Inc., Rahway, N.J., a corporation of New Jersey
No Drawing. Continuation-in-part of application Ser. No. 203,446, June 19, 1962. This application Mar. 13, 1964, Ser. No. 351,817
13 Claims. (Cl. 260—607)

This application is a continuation-in-part of my copending application Ser. No. 203,446, filed June 19, 1962, now abandoned.

This invention relates to derivatives of dibenzocycloheptenes. In particular, the invention is concerned with dibenzocycloheptenes which are substituted at the 5-position with a γ-hydroxypropyl or alkyl substituted γ-hydroxypropyl substituent and a method for preparing the same.

The process provided by the present invention involves reacting a 5-alkali metal or 5-halomagnesium derivative of a dibenzocycloheptene with trimethylene oxide or a lower alkyl substituted trimethylene oxide to form a 5-(γ-hydroxypropyl) or 5-(γ-hydroxyloweralkylpropyl) substituted dibenzocycloheptene. While the process is particularly suitable for the preparation of those 5-(γ-hydroxypropyl) and 5-(γ-hydroxyloweralkylpropyl)-dibenzocycloheptenes which are otherwise nuclearly unsubstituted, it may be used with equal facility for the preparation of 5-(γ-hydroxypropyl) and 5-(γ-hydroxyloweralkylpropyl)-dibenzocycloheptenes which may be substituted in the benzene moieties with one or more substituents from the appropriately substituted ketones providing such substituents will not react with the reagents utilized in the process. Thus, for example, the process may be used to prepare 5-(γ-hydroxypropyl) and 5-(γ-hydroxyloweralkylpropyl)-dibenzocycloheptenes which are substituted in the benzene moieties with one or more groups such as lower alkyl, lower alkoxy, lower alkenyl, halogen, mercapto, loweralkylmercapto, loweralkylsulfonyl, diloweralkylsulfamyl and phenyl. In addition, the process of the present invention also may be utilized to prepare those 5-(γ-hydroxypropyl) and 5-(γ-hydroxyloweralkylpropyl)-dibenzocycloheptenes which are also substituted at either the 10 or 11 positions with a halogen atom. The substitution at the 10 or 11 positions can be in addition to or in lieu of other nuclear substituents.

Representative compounds which may be prepared in accordance with this invention include:

10-chloro-5-(γ-hydroxypropyl)-5H-dibenzo[a,d]cycloheptene
10,11-dihydro-5-(γ-hydroxypropyl)-3-mercapto-5H-dibenzo[a,d]cycloheptene
5-(γ-hydroxypropyl)-3-methylsulfonyl-5H-dibenzo[a,d]cycloheptene
3,10-dichloro-5-(γ-hydroxypropyl)-5H-dibenzo[a,d]cycloheptene
10,11-dihydro-5-(γ-hydroxypropyl)-3-methylmercapto-5H-dibenzo[a,d]cycloheptene
5-(3-hydroxy-2-methylpropyl)-5H-dibenzo[a,d]cycloheptene
5-(3-hydroxy-3-methylpropyl)-5H-dibenzo[a,d]cycloheptene
5-(γ-hydroxypropyl)-3-methyl-5H-dibenzo[a,d]cycloheptene
5-(γ-hydroxypropyl)-3-methoxy-5H-dibenzo[a,d]cycloheptene For purposes of illustration, the preparation of the compounds 5-(γ-hydroxypropyl)-5H-dibenzo[a,d]cycloheptenes and 10,11-dihydro-5-(γ-hydroxypropyl)-5H-dibenzo[a,d]cycloheptenes may be represented structurally as follows:

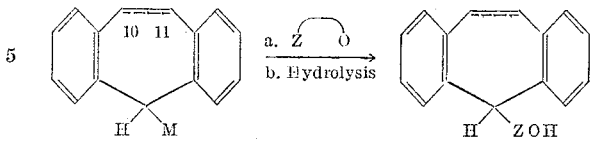

In the above reaction scheme, M represents an alkali metal such as lithium, potassium or sodium, or halomagnesium wherein the halo is preferably chlorine or bromine; Z is a trimethylene or loweralkyl substituted trimethylene radical and the dotted line indicates that the compounds may be saturated or unsaturated at the 10,11-positions.

However, as previously indicated hereinabove, the above illustrated process may be utilized for the preparation of those dibenzocycloheptenes containing one or more nuclear substituents by employing as the starting compound an appropriate nuclearly substituted dibenzocycloheptene in place of the unsubstituted dibenzocycloheptene.

As illustrated by the reaction scheme above, the process involves the reaction of a 5-alkali metal or 5-halomagnesium substituted dibenzocycloheptene with trimethylene oxide or a loweralkyl substituted trimethylene oxide, and thereafter hydrolyzing the resulting product to form the corresponding 5-(γ-hydroxypropyl) or 5-(γ-hydroxyloweralkylpropyl)-derivative. The starting compounds may be readily prepared following the procedures heretofore described in the literature.

In those cases where the starting compounds contain one or more nuclear substituents, they may be prepared from the appropriately substituted dibenzocyclohepten-5-ones. These latter compounds can be prepared as described in the literature or the examples which follow.

The reaction of the 5-alkali metal or 5-halomagnesium substituted dibenzocycloheptene with the trimethylene or loweralkyl substituted trimethylene oxide is carried out in an inert, organic solvent. In general, those solvents conventionally employed in the preparation of the starting compounds can be utilized. The temperature at which the reaction is carried out is not critical, but it is desirable to use elevated temperatures. Preferably, the reaction is carried out at reflux temperature. Likewise, the ratio of reactant is not critical, although it is preferred to employ an excess of the oxide. Hydrolysis of the resulting product is effected in an aqueous medium such as by the addition of water to the reaction mixture. The desired product can readily be recovered using conventional techniques.

The compounds prepared in accordance with the process of the invention are useful as intermediates in the preparation of dibenzocycloheptenes which are substituted at the 5-carbon atom with an aminopropyl or aminopropylidene radical and are useful as antidepressants and serve as mood elevators or psychic energizers, as described in copending application Ser. No. 200,659, filed June 7, 1962, now abandoned.

The following examples are given for purposes of illustrating the present invention and are not to be construed as limiting the invention.

Example 1.—5-(γ-hydroxypropyl)-5H-dibenzo
[a,d]cycloheptene

A solution of 0.01 mole (1.8 g.) of the 5-lithium salt of 5H-dibenzo[a,d]cycloheptene in 50 cc. ether is treated with 1.5 equivalents (1.0 g.) of trimethylene oxide. The mixture is refluxed for a period of 5 hours. At the conclusion of this period, water is added to the reaction mixture. The ether layer is separated, washed with dilute hydrochloric acid, then dried and concentrated to yield 5-(γ-hydroxypropyl)-5H-dibenzo[a,d]cycloheptene.

Example 2

Following the procedure described in detail in Example 1 and using the lithium salt of 5H-dibenzo[a,d]-10,11-dihydrocycloheptene in place of the lithium salt of 5H-dibenzo[a,d]cycloheptene, there is produced upon reaction with trimethylene oxide the corresponding 10,11-dihydro derivative of 5 - (γ - hydroxypropyl) - 5H - dibenzo[a,d]cycloheptene.

Example 3

Following the procedure described in detail in Examples 1 and 2 and using, in turn, equivalent amounts of the sodium, potassium and chloro magnesium salts of 5H-dibenzo[a,d]cycloheptene and 10,11-dihydro - 5H - dibenzo[a,d]cycloheptene in place of the 5-lithium salt, there are produced in a similar manner 5-(γ-hydroxypropyl)-5H-dibenzo[a,d]cycloheptene and 5-(γ-hydroxypropyl)-5H-dibenzo[a,d]-10,11-dihydrocycloheptene.

Example 4

By using methyl, ethyl and propyl substituted trimethylene oxides in place of trimethylene oxide in the above examples, there are produced the corresponding 5-(γ-hydroxyloweralkylpropyl)-dibenzocycloheptenes.

I claim:
1. 5H-dibenzo[a,d]cycloheptenes which are substituted at the 5-position with γ-hydroxypropyl or γ-hydroxy lower-alkyl propyl groups and which may be substituted at the 3-position of the benzo moieties with lower-alkyl, lower-alkoxy, lower-alkylsulfonyl, lower-alkylmercapto or mercapto.
2. A compound of the formula

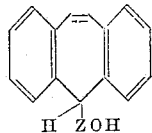

wherein the dotted line indicates that the compounds may be unsaturated at the designated positions and Z is trimethylene or lower-alkyl substituted trimethylene.

3. 5 - (γ - hydroxypropyl) - 5H - dibenzo[a,d]cycloheptene.
4. 5 - (γ - hydroxypropyl) - 5H - 10,11 - dihydrodibenzo[a,d]cycloheptene.
5. 3 - mercapto - 5 - (γ - hydroxypropyl) - 5H - 10,11-dihydrodibenzo[a,d]cycloheptene.
6. 3 - methylsulfonyl - 5 - (γ - hydroxypropyl) - 5H-dibenzo[a,d]cycloheptene.
7. 3 - methylmercapto - 5 - (γ - hydroxypropyl) - 5H - 10,11-dihydrodibenzo[a,d]cycloheptene.
8. 5 - (3 - hydroxy - 2 - methylpropyl) - 5H - dibenzo[a,d]cycloheptene.
9. 5 - (3 - hydroxy - 3 - methylpropyl) - 5H - dibenzo[a,d]cycloheptene.
10. 3 - methyl - 5 - (γ - hydroxypropyl) - 5H - dibenzo[a,d]cycloheptene.
11. 3 - methoxy - 5 - (γ - hydroxypropyl) - 5H - dibenzo[a,d]cycloheptene.
12. 10 - chloro - 5 - (γ - hydroxypropyl) - 5H - dibenzo[a,d]cycloheptene.
13. 3,10 - dichloro - 5 - (γ-hydroxypropyl) - 5H - dibenzo[a,d]cycloheptene.

References Cited

UNITED STATES PATENTS 2,985,660   5/1961   Judd et al. _____ 260—294 X

OTHER REFERENCES

Cope et al.: J. Am. Chem. Soc., vol. 73, pp. 1673–79 (1951).
Cristol et al.: J. Am. Chem. Soc., vol. 82, pp. 6155–62 (1960).
Searles: J. Am. Chem. Soc., vol. 73, pp. 124–5 (1951).
Treibs et al.: Berichte, vol. 84, pp. 671–79 (1951).
Winthrop et al.: J. Org. Chem., vol. 27, pp. 230–40 (1962).

LEON ZITVER, *Primary Examiner.*

T. G. DILLAHUNTY, *Assistant Examiner.*